United States Patent [19]

Jones

[11] 4,275,959
[45] Jun. 30, 1981

[54] FILM PROCESSOR APPARATUS

[75] Inventor: Howard P. Jones, Salt Lake City, Utah

[73] Assignee: Edo Western Corporation, Salt Lake City, Utah

[21] Appl. No.: 37,660

[22] Filed: May 10, 1979

[51] Int. Cl.³ .............................................. G03B 27/72
[52] U.S. Cl. ....................................... 355/20; 355/27; 354/299; 354/319; 219/216; 219/388; 219/216;388
[58] Field of Search ...................... 355/20, 27, 100, 28; 354/75, 76, 78, 83, 297, 299, 319; 226/104, 105, 118, 181, 188

[56] References Cited

U.S. PATENT DOCUMENTS

| | | | |
|---|---|---|---|
| 3,203,635 | 8/1965 | Rayfield et al. | 226/118 |
| 3,237,541 | 3/1966 | Gallagher | 354/334 |
| 3,264,961 | 8/1966 | Tuttle et al. | 354/78 |
| 3,282,183 | 11/1966 | Tuttle et al. | 354/78 |
| 3,349,222 | 10/1967 | Johnston | 219/388 |
| 3,449,547 | 6/1969 | Goodman et al. | 219/388 |
| 3,496,332 | 2/1970 | Lunde | 219/388 |
| 3,557,675 | 1/1971 | Koll | 355/27 |
| 3,743,412 | 7/1973 | Morse | 355/20 |
| 3,826,896 | 7/1974 | Thompson | 219/388 |
| 4,021,110 | 5/1977 | Pundsack | 355/100 |
| 4,115,817 | 9/1978 | Suzuki et al. | 355/28 |
| 4,158,496 | 6/1979 | Cieplik | 355/27 |

Primary Examiner—L. T. Hix
Assistant Examiner—Alan Mathews
Attorney, Agent, or Firm—Thorpe, North, Western & Gold

[57] ABSTRACT

A dry film processor includes a housing, a film supply canister disposed in the housing for holding film and supplying it to the other processing apparatus, a take-up canister also disposed in the housing for receiving and holding the film after it has been processed, storage apparatus for receiving film from the supply canister and for supplying the film to the take-up canister, a drive roller for moving the film from the supply canister to the storage apparatus at a speed determined by certain input speed signals, heater apparatus for heating the film to enable development thereof, drive belt apparatus responsive to control signals for moving the film to withdraw it from the storage apparatus and move it past the heater apparatus, and a control unit for supplying control signals to the drive belt apparatus. An aperture is formed in the housing and the film is moved past the aperture to allow exposure thereof to a cathode ray tube or other light producing structure from which information is to be received and recorded on film. The heater apparatus includes a heater element which may be moved into and out of contact with the film to thereby commence or discontinue development of the film. Also, the control unit supplies signals to the heater apparatus to control the temperature thereof and thus further control the rate at which development of the film occurs.

12 Claims, 4 Drawing Figures

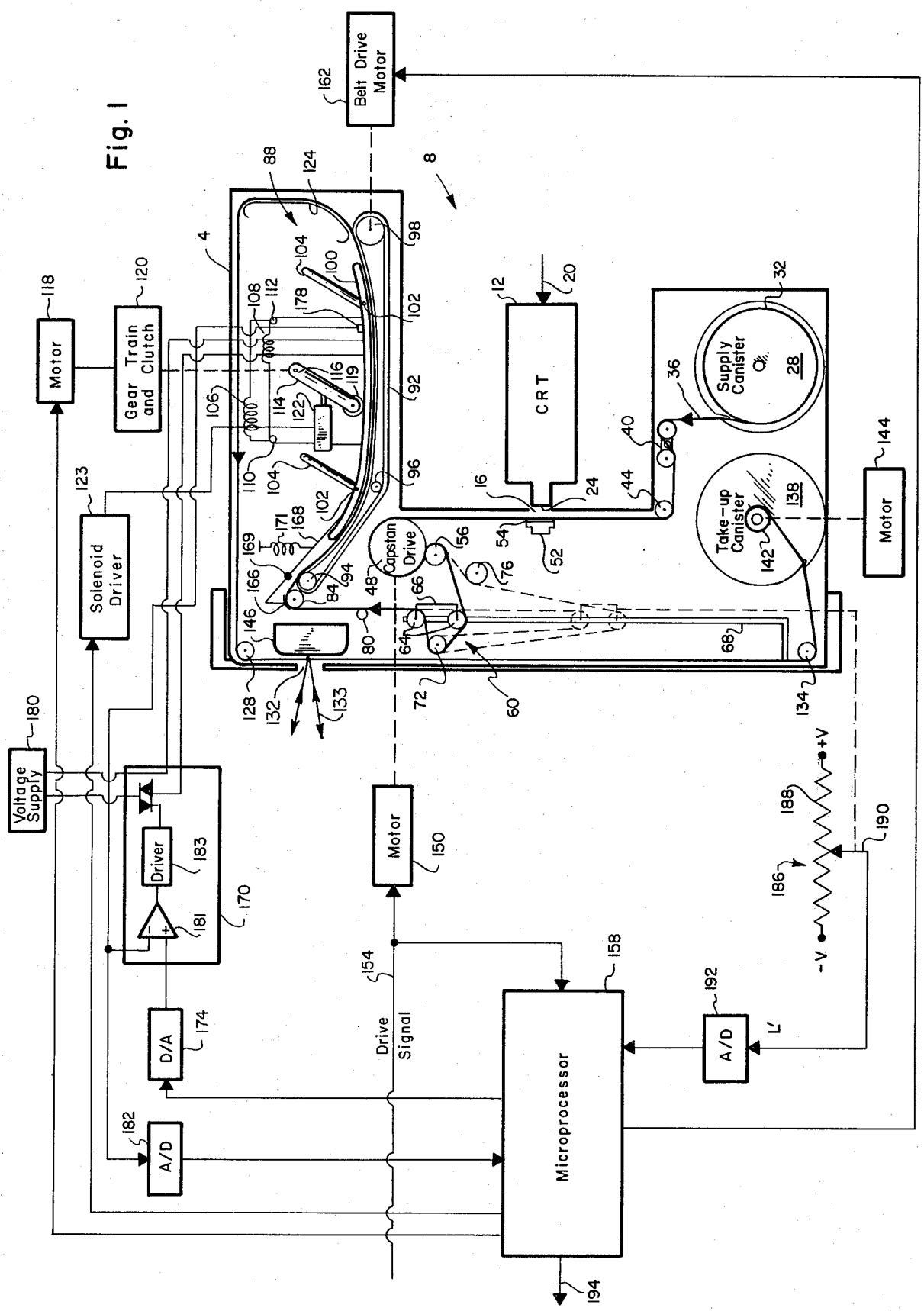

FILM PROCESSOR APPARATUS

BACKGROUND OF THE INVENTION

This invention relates to processor apparatus for processing and developing, on a substantially continuous basis, dry silver film of a conventional type.

Underground exploration for petroleum or mineral sources utilizes a process known as well-logging in which a hole or bore is drilled downwardly in the earth and then sensors of various types are lowered into the hole to detect characteristic of the subsurface strata. Data or information from the sensors are transmitted up through the cable holding the sensors to the surface where records may be made of the information for later interpretation and analysis. Advantageously, the data received from the sensors is recorded in real time so that on-the-spot examination can be made and modification of drilling procedures carried out in case the data dictates such modification.

Perhaps the most common method of recording such data is by use of so-called pen recorders which typically consist of mechanical styli or pens which move back and forth across the surface of chart paper which itself is moving in a direction generally perpendicular to the movement of the styli. As the styli move across the paper, they record on the paper traces whose position along the length of the trace is proportional to the outputs of the sensors. Because such recorders require mechanical placement of the data on the recording paper, the versatility of the recorder is limited as to accuracy, speed of operation (both of the styli and the chart paper), and reliability and life of the recorder parts.

Because of the drawbacks of pen recorders, systems have been proposed in which data from the sensors is displayed on a cathode ray tube or other visual display device and then some type of film is exposed to the face of the cathode ray tube to make a permanent record of the data. So-called wet film is typically used in which case the film is first exposed and then, at a subsequent time, processed or developed to provide the desired record. The disadvantage of this process is that the record is not immediately available for inspection to the system users.

It would be desirable to have a data recording system in which the disadvantages of the prior art mechanical pen recorders are avoided and yet in which the data is made available immediately to the user. This would mean that whatever film is used for recording the images produced by the cathode ray tube or other type of video display device would be processed at substantially the same time as the data is received from the underground sensors. Because the rate of receipt of such data may vary depending, for example, on the rate at which the sensors are lowered into or raised from the drill hole, it would be necessary that the processing of the film somehow accommodate the varying rate at which the data were received.

Dry silver film is a type of film which might be advantageously used in a real time recorder since the film may be developed by subjecting it to a certain range of temperatures. Such film does not require the chemical processing needed for wet film and therefore appears to offer advantages in simplicity not present with wet film.

SUMMARY OF THE INVENTION

It is an object of the present invention to provide a new and improved data recording system for recording on dry silver film data received from an external source.

It is another object of the invention to provide such a recording system in which the film may be processed and developed on a continuous basis as the data is received.

It is a further object of the invention to provide such a recording system in which the information recorded on film may be viewed immediately after the film is processed and developed.

It is still another object of the invention to provide such a recording system in which the film is developed by exposing it to heat wherein the amount of heat and time of exposure of the film to the heat is controlled in accordance with the rate at which the data to be recorded is received.

The above and other objects of the invention are realized in a specific illustrative embodiment of a recording system which uses dry silver film for recording data received from an external source. Speed signals are also received from the external source to indicate the rate at which data is being supplied to the system. The system includes film supply apparatus for supplying dry film, film take-up apparatus for receiving and holding the film after processing, storage apparatus for receiving film from the supply apparatus and for supplying film to the receiving apparatus at a speed which may vary from the speed at which the film is received, first drive apparatus responsive to the speed signals for moving the film from the supply apparatus to the storage apparatus at a speed determined by the speed signals, structure for exposing the film to light images which are to be stored on the film, a heater for heating the film to enable development thereof, and a second drive apparatus responsive to control signals for moving the film from the storage apparatus past the heater to the take-up apparatus. A control unit is provided for monitoring the temperature of the heater and for supplying control signals to the second drive apparatus to control the speed at which the film is moved past the heater. The control unit also monitors the amount of film in the storage apparatus to either terminate the receipt of data when the storage apparatus becomes full, or to slow down film development when the storage apparatus is nearly empty of film. Development of the film is slowed by simply reducing the temperature of the heater and the speed at which the film is moved past the heater.

In accordance with one aspect of the invention, the film processing apparatus is disposed within a housing which has an aperture therein past which developed film is caused to move prior to being supplied to the film take-up apparatus, and through which a user may view the film immediately after it is developed.

BRIEF DESCRIPTION OF THE DRAWINGS

The above and other objects, features and advantages of the invention will become apparent from a consideration of the following detailed description presented in connection with the accompanying drawings in which:

FIG. 1 shows a side cross-sectional view of a dry film processor made in accordance with the present invention, and a schematic of the control logic;

DETAILED DESCRIPTION

Figure 2A:
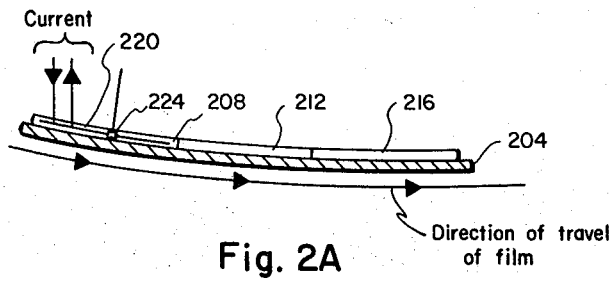
FIGS. 2A and 2B show a side, cross-sectional view and a top plan view respectively of the heater platen of FIG. 1.

FIG. 1 shows a cross-sectional view of one illustrative embodiment of dry film recorder or processing apparatus, together with the control logic for controlling such apparatus. The apparatus includes a housing 4 for containing both the mechanical and electronic gear of the apparatus (even through the electronic circuitry is shown outside the housing). The housing 4 is formed with a hollow 8 in one side thereof to receive a cathode ray tube 12, or similar light producing apparatus, for positioning adjacent an aperture 16 formed in the housing. The cathode ray tube 12 receives signals from an external source via lead 20 and in response to such signals produces on a faceplate 24 light images of data represented by the received signals. These light images are conveyed through the aperture 16 either by a fiber optic bundle or by way of an optical lens assembly to expose film carried adjacent to the aperture within the housing. The cathode ray tube 12 could illustratively be the Litton type L4271 produced by Litton Systems, Inc.

Within the housing 4 is mounted a film supply canister 28 which contains a supply reel 32 on which is wound dry silver film 36 to be used in recording the light images produced by the cathode ray tube 12. Advantageously, the dry silver film could be type 7869 produced by 3M Corporation. The dry film 36 extends from the reel 32 and supply canister 28 (which are of conventional design) to a pair of conventional tension rollers 40, and from there about a guide roller 44. From the guide roller 44 the film 36 extends along an inside wall of the housing past the aperture 16 to a conventional capstan drive roller 48. A pressure pad 52, which may be made of aluminum covered with soft velvet 54, maintains the film within a certain distance of the cathode ray tube faceplate 24 (against the ends of the fiber optic bundle if fiber optic strands are used, or at the focal point if a lens assembly is used). The film 36 is wound about and between the capstan drive 48 and a pressure roller 56 prior to entering film storage structure 60.

The film storage structure 60 is provided to take up the slack which may occur in the film as a result of the film being withdrawn from the supply canister 28 at a higher speed than the film is processed by film developing and processing apparatus (to be discussed momentarily). The film storage structure 60 includes a pair of so-called storage rollers 64 whose axles are joined by a coupling rod 66 to maintain a fixed distance apart as indicated in the drawing. The ends of the axles of the storage rollers 64 are fixed in a guide track or slot 68 so that the storage rollers are caused to move together in a vertical direction along the length of the track. A guide roller 72 is mounted in the housing 4 in a fixed position relative to the storage rollers 64.

If the film 36 is removed from the storage structure 60 at a faster rate than it is fed into the storage structure, then the film tends to carry the storage roller 64 upwardly along the guide track 68. On the other hand, if the film 36 is fed to the storage structure 60 at a faster rate than it is withdrawn therefrom, then under gravity the storage rollers 64 move downwardly along the track—such as indicated by the dotted outline of the storage rollers in FIG. 1. The effect of the storage rollers 64 moving downwardly is to increase the amount or length of film contained in the storage structure 60. Another guide roller 76 is provided to contact and guide the film as the storage rollers 64 move downwardly.

After leaving the storage structure 60, the film 36 travels past a film guide bar 80 fixed in the housing and over a guide roller 84 similarly fixed in the housing to heater apparatus 88. At this point, the film 36 is carried by a resilient drive belt 92 constructed, for example, of rubber. The drive belt 92 is at least as wide as the film 36 and is wound about fixed rollers 94, 96 and 98. The upper portion of the drive belt 92 (that which extends between rollers 94 and 98) is conformable to whatever surface formation may be impressed against the upper surface of the belt. The function of this drive belt will be described momentarily.

The heater apparatus 88 includes a heater platen 100 formed to present a generally convex lower surface which conforms generally to the upper surface of the drive belt 92. The platen 100 is movable between a heat position (shown in FIG. 1) in which the platen is adjacent to the drive belt 92, and a rest position in which the platen 100 is moved upwardly away from the drive belt 92. The platen includes guide pins 102 disposed on either side thereof to extend outwardly from the platen and into guide tracks 104 formed in the housing 4 for guiding the platen as it moves between its heat position and rest position. The platen 100 is biased upwardly toward its rest position by a pair of springs 106 and 108, each of which is connected between a different support post 110 and 112, over the top of the other support post and downwardly to the top of the platen 100. In effect, the springs 106 and 108 tend to pull or force the platen 100 upwardly unless maintained in its heat position by an arm 114. The arm 114 is arranged to pivot about a pivot point 116 under control of a motor 118 and gear train and clutch 210, and includes a wheel 119, located at the end opposite the pivot end, which acts against the top surface of the platen 100. When the motor 118 causes the pivot arm 114 to pivot downwardly to an over-center position (shown in FIG. 1), the platen 100 is forced downwardly, guided by the guide tracks 104 to the heat position. To move the platen 100 to the rest position, a solenoid 122 is operated by a solenoid driver 123 to force the arm 114 from its over-center position where it no longer holds the platen 100 in the heat position. Then the springs 106 and 108 pull the platen 100 upwardly to its rest position. (The gear train and clutch 120 operate to force the arm 114 downwardly when driven by the motor 118, but to allow the arm to move upwardly when not driven by the motor.)

Figure 2B:
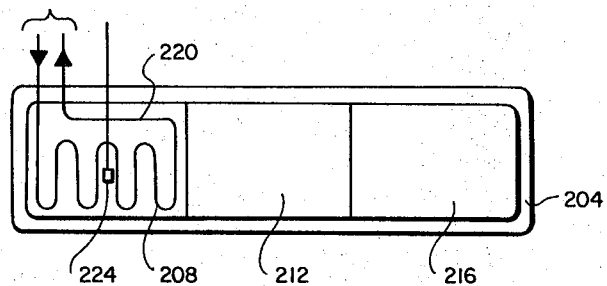

The heater platen 100, although shown as a single element in FIG. 1, could advantageously include segmented heater elements such as shown in FIGS. 2A and 2B. As there shown, a single platen body 204 of heat conductive material, such as aluminum, is provided. Three heater segments 208, 212 and 216 are attached to the top of the body 204. Each segment is composed of a heat conductive material, such as silicone, in which is coiled wire conductors, such as conductor 220. Electrical current is supplied to the conductors to heat the conductors and thus the corresponding segment. The segments 208, 212 and 216, in turn, heat the platen body 204. Temperature sensing devices, such as device 224 which illustratively could be a thermistor, are embedded in each of the segments 208, 212 and 216 to sense the temperature of the segments. The purpose of this and the advantage of providing segmented heater elements will be discussed more fully later.

After leaving the heater apparatus 88, the film 36 passes around a fixed film guide 124, consisting of a curved plate, and back along the top of the housing to a fixed guide roller 128. From there, the film passes along a wall of the housing past an aperture 132 formed in the wall, and then downwardly to another fixed guide roller 134. Finally, the film travels from the guide roller 134 into a take-up canister 138 and onto a take-up reel 142 contained in the canister. The take-up reel 142 reels in the film under substantially constant tension provided by a motor and slip clutch 144.

The aperture 132 is formed in the housing to enable a user to view the developed film and thus see the data essentially immediately after recordation of the data on the film. A light colored reflector 146 may be positioned adjacent the aperture 132 on the other side of the path of travel of the film so that light 133 entering the aperture and traveling through the film will be reflected back out of the aperture 146. This facilitates reading the images recorded on the film.

The film 36 is moved by several drive mechanisms including the capstan drive roller 48 which is driven by a conventional stepping motor 150. The stepping motor 150 responds to speed or drive signals (a train of pulses) supplied via lead 154 from an outside source and representing the rate at which data signals are supplied to the CRT 12. The capstan drive roller 48 is stepped and then halted for each set or line of data produced by the cathode ray tube 12 and after each such set or line of data exposes the film 36, the motor 150 causes the capstan drive roller 48 to again move the film by a predetermined amount. The speed of operation of the motor 150 is determined by the frequency of drive pulses supplied to lead 154 by apparatus which is collecting the data to be recorded on the film. For example this might be well-logging equipment used to gather data about subsurface formations. The drive pulses, which for well-logging equipment have a frequency proportioned to the rate at which the sensors are lowered or raised in the drill hole, are also supplied to a microprocessor 158 which generally controls the operation of the film processing apparatus. The microprocessor 158 could illustratively be an F-8 microprocessor produced by Fairchild Semiconductor, Inc.

The film 36 is withdrawn from the storage structure 60 by the drive belt 92 which is powered by a belt drive stepping motor 162. The motor 162 drives the roller 98 which, in turn, causes the drive belt 92 to move and thus carry the film between the platen 100 and the drive belt. The motor 162 responds to pulses from the microprocessor 158 to drive the drive belt 92. The only time the motor 162 is caused to drive the drive belt is when the platen 100 is in its heat position. The motor 118 and solenoid 122 respond to signals from the microprocessor 158 to place the platen 100 in either the heat position or the rest position and when in the rest position, the microprocessor 158 terminates the application of pulses to the belt drive motor 162 to thus terminate movement of the film through the heater apparatus 88. The reason for this is that the film requires heat to develop and when the platen 100 is in its rest position, there is insufficient heat to develop the film so the film must be stopped. To prevent even slight movements of the film after the platen 100 is moved upwardly, a brake pad 166 is caused to engage the film to prevent any further movement. The brake pad 166 is actuated by a pivot arm 168, one end of which extends into the path of a guide track 104 to be contacted and moved downwardly by a guide pin 102 when the platen 100 is moved to the heat position. When this occurs, the pivot arm 168 pivots about pivot point 169 to force the brake pad 166, which is attached to the other end of the pivot arm 168, upwardly away from the film 36. When the solenoid returns the platen to the rest position, the spring 171 exerts force on the pivot arm to move the brake pad to contact and stop the film 36.

The temperature of the platen 100 is controlled by a heater temperature control unit 170 which receives signals from a digital-to-analog convertor 174. The digital-to-analog convertor 174 converts digital signals received from the microprocessor 158 to analog signals which are then applied to the heater temperature control unit 170. These signals indicate what the temperature of the platen 100 is to be. The heater temperature control unit 170 also receives signals from a temperature sensor 178 disposed in the platen 100, which signals specify the temperature of the platen. The signals from the convertor 174 are compared with the signals from the sensor 178, and if the former exceed the latter, then the control unit 170 enables the flow of current from a voltage source 180 to the platen 100 to further heat the platen. When the compared signals match, then just so much current is supplied to the platen 100 to maintain the temperature thereof at a level specified by the signals supplied by the microprocessor 158 to the digital-to-analog convertor 174. Of course, the temperature of the platen 100 can be changed simply by changing signals supplied to the digital-to-analog convertor.

Exemplary circuitry for the heater temperature control unit 170 is shown in FIG. 1 to include a differential amplifier 181 whose inverting input is connected to the temperature sensor 178, and whose noninverting input is connected to the digital-to-analog convertor 174. If the signal on the noninverting input is higher than the signal on the inverting input, then the amplifier 181 signals a triac driver 183 to trigger a triac 185 into a conducting condition. The triac 185 then conducts current from the voltage source 180 to the platen 100. If the signal on the noninverting input is lower than the signal on the inverting input, then the amplifier 181 applies no signal to the triac driver 183 and the triac 185 remains nonconducting.

The signals from the temperature sensor 178 are also supplied to an analog-to-digital convertor 182, which converts the analog signals to digital signals for supplying to the microprocessor 158. In this way, the microprocessor 158 monitors the temperature of the platen and then may adjust the value of signals supplied to the heater temperature control unit 170 and to the belt drive motor 162 as may be necessary to change the temperature of the platen or the speed of the film 36 for proper processing and development of the film. For example, for a certain temperature of the platen 100, the microprocessor 158 will adjust the speed of the motor 162 so that the film will be moved past the heater platen 100 at a speed which will enable development thereof.

Since the speed of movement of the film 36 past the heater platen 100, and thus the rate of withdrawal of film from the storage structure 60, may differ from the rate at which film is supplied to the storage structure, the storage structure may either be filling up with film or emptying of film, and this fact should be known by the microprocessor 158 so that it can take steps, if possible to avoid either filling or emptying the storage structure. To determine the amount of film in storage, a potentiometer 186 is provided, with the potentiometer including a resistor 188 connecting a positive voltage source to a negative voltage source, and a wiper element 190 which contacts the resistor. The position of the wiper element 190 determines the magnitude of the voltage supplied to the analog-to-digital convertor 192, where this convertor converts the signal to a digitl signal for application to the microprocessor 158. The position of the wiper element 190 along the resistor 188 is determined by the vertical position of the storage rollers 164. In particular, the wiper element 190 is mechanically coupled to the storage rollers so that when the storage rollers move downwardly, the wiper element moves to the right. Thus, the magnitude of the voltage signal applied to the analog-to-digital convertor 192 provides a measure of the amount of film in the storage structure 60.

If the storage structure 60 begins to fill up with film, the microprocessor 158 signals the heater temperature control unit 170 to increase the temperature of the heater platen 100. Then, as the temperature rises, the speed of the belt drive motor 162 is increased accordingly to increase the rate of withdrawal of film from storage. If the film cannot be withdrawn fast enough to prevent fill-up of the storage structure 60, the microprocessor 158 supplies a warning signal via lead 194 to the equipment supplying the drive signals to the motor 150 to cause such equipment to terminate, for the time being, application of signals to the motor.

If the storage structure begins to empty, the microprocessor detects this and signals the belt drive motor 162 to stop, and signals the solenoid driver 128 to cause the solenoid 122 to force the arm 144 upwardly so that the heater platen 100 is raised to the rest position. Typically, the microprocessor also signals the heater temperature control unit 170 to lower the temperature of the heater platen 100. When the storage structure 60 begins to fill up again (or at least reaches a certain level), the microprocessor 158 signals the heater temperature control unit 170 to raise the temperature of the platen 100, signals the motor 118 to lower the platen 100 to the heat position, and signals the belt drive motor 162 to operate at a speed dictated by the temperature of the platen. The processing of the film then continues as described before. Thus by appropriate positioning of the platen alternately in the heat position and the rest position, with the film storage alternately emptying and filling, a wide range of drive or speed signals can be accommodated, even as low as zero which would represent stopping movement of the sensors in the drill hole of a well logging operation.

Heating of the platen 100 will now be briefly discussed in conjunction with FIGS. 2A and 2B. Heater segment 208 is adopted to have a greater power density (will heat faster) than segment 212 which, in turn, has a greater power density than segment 216. (Power density is determined by the resistance of the conductor wire disposed in a segment.) The reason for the segment 208 having the greatest power density is that this segment is the first contacted by the film and thus it must raise the temperature of the film from ambient temperature to the film developing or processing temperature. The other segments need only maintain the temperature of the film and so need less power density. Since each segment of the platen is heated independently of the other segments by microprocessor and heater control logic, the temperature of each segment can be controlled independently.

The object of heating the platen body 204 is to provide a substantially uniform heating of the film along that portion of the film in contact with the platen body. This is done by heating each segment to substantially the same temperature prior to moving the platen into the heat position. However, since the film contacted by the platen may be at different temperatures, the film may tend to draw heat from the segments at different rates so that a temperature variation is created among the segments. This is detected by the temperature sensors and the microprocessor, and signals are applied by the microprocessor to the heater temperature control units of each segment to bring the temperature of the segments to substantially the same level.

Figure 3:
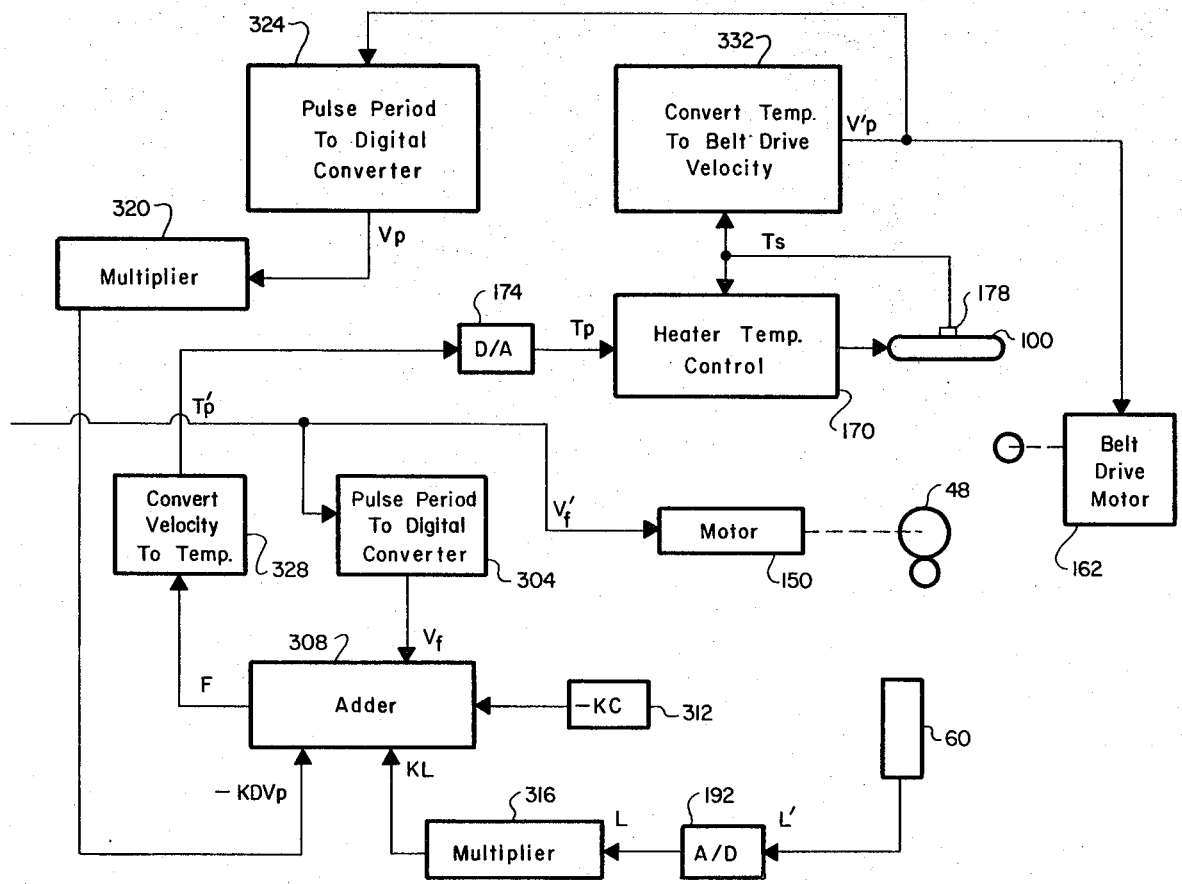
FIG. 3 shows a functional block diagram illustrating the operation of the control logic of FIG. 1.

FIG. 3 is a functional block diagram of an illustrative mode of operation of the microprocessor 158 and associated control logic of FIG. 1. The system equation which represents the operation of the FIG. 3 diagram during processing and development of the film (i.e., when the heater platen 100 is in the heat position) is:

$$F = Vf + KL - KC - KDVp$$
$$= Vf + K(L - C - DVp)$$

Where
F is the film processing command speed in length-/time,
Vf is the speed of the film supplied to film storage in response to externally supplied drive signals or pulses in length/time,
L is the actual length of the film in storage,
C and D are scaling constants which are selected to allow for various film length storage for the different allowable valves of Vp—determined by the film storage capacity,
Vp is the speed of the film withdrawn from storage in length/time, and
K is a constant representing a film storage factor, i.e., K is selected to slow the response time of the system to changes in Vf.

The function performed by each of the blocks of FIG. 3 is identified by the label in the block, and the outputs of those blocks which form part of the above equation are indicated. The operation represented by the FIG. 3 diagram is initiated upon receipt by the motor 150 and a pulse period to digital convertor 304 of drive pulses from an external source. These pulses drive the motor 150 to operate at a certain speed determined by the pulses Vf. The convertor 304 converts the pulse period of the drive pulses to a corresponding digital value for application to an adder 308. Other inputs to the adder 308 are a constant −KC supplied by block 312, KL supplied by a multiplier 316 in response to a digital signal L from the analog-to-digital converter 192, and a value −KDVp supplied by a multiplier 320 in response to a digital signal Vp received from a pulse period to digital converter 324. The adder 308 adds the quantities together to obtain a value F which is supplied to a table look-up convertor 328. This convertor, for the value of F received, determines from a table what the temperature of the platen 100 should be and supplies this value Tp' to the digital-to-analog convertor 174 which converts the digital value to an analog value for application to the heater temperature control unit 170 earlier described. The control unit 170 compares the value Tp with the detected temperature Ts of the platen 100 and then supplies current to the platen to cause its temperature to move in the direction of the temperature Tp. The detected temperature Ts is also converted by another table look-up convertor 332 to a film speed pulse signal Vp' which is appropriate for the detected temperature. This signal is supplied to the belt drive motor 162 to drive the motor and thus the drive belt 92 of FIG. 1. The pulse signal Vp' is also supplied to the pulse period to digital convertor 324 which converts the pulse period of the signal to a digital value Vp.

With the operation described, and except for values of Vp above a certain level and below another level, the system tends toward equilibrium in which F=Vf, i.e., L=C+DVp. thus, for every speed Vp in the acceptable range, a certain length of film L will be "stored" in film storage. For film speed values of Vp outside a certain range, the film speed is simply too slow or too fast for proper film processing. If it is too slow, the film is simply stopped for a time and the platen 100 is placed in the rest position until a certain length of film is built up in film storage. If it is too fast, then the equipment supplying the drive signal Vf is signaled to terminate supply of the signal. It has been found that for 3M film 7869 and a platen of about 10 inches in length, film speeds of from 10 inches/min. to 50 inches/min. can be used for various platen temperatures of from 245° F. to 290° F. The appropriate film speeds for the different temperatures (and vice versa) for use by the convertors 328 have been ascertained by simply trying various combinations.

In the manner described, a dry film processor provides for continuous, real-time processing and development of film on which is stored data received from an external source. The processing speed may be varied to accommodate different rates at which the data may be received to provide almost immediate availability for view of the film record.

It is to be understood that the above-described arrangments are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A dry film processor for use in a system which supplies processor speed signals, said processor including supply means for supplying dry film,
   receiving means for receiving and holding film,
   storage means for receiving film from said supply means and for supplying the film to said receiving means at a speed which may vary from the speed at which the film is received,
   first drive means responsive to said speed signals for causing the film to move from said supply means to said storage means at a first variable speed determined by said speed signals,
   means for exposing the film to light images to be stored on the film,
   heater means for heating the film to enable development thereof, said heater means including a heater element movable toward and away from the film,
   second drive means responsive to control signals for causing film to move from said storage means past the heater element at a second variable speed to said receiving means, which second variable speed may be different from said first variable speed, said second variable speed having a range of between zero and a maximum speed, and
   control means for supplying control signals to said second drive means.

2. A processor as in claim 1 further including first and second guide means for respectively guiding the film to said storage means from said supply means, and from said storage means to said receiving means, and wherein said storage means comprises
   a first fixed roller about which the film is wound, and
   a second roller about which the film is wound, said second roller being movable under gravity away from said first roller when the film is being supplied to the storage means at a higher speed than the speed at which the film is being withdrawn from the storage means to thereby increase the length of the film between said supply means and receiving means.

3. A processor as in claim 2 wherein said storage means further comprises a third roller spaced a fixed distance above and movable with said second roller, and a generally vertically disposed guide track along which said second and third rollers move, and wherein the first, second and third rollers are arranged so that the film passes from the first drive means under the second roller, around and over the first roller, and under the third roller.

4. A processor as in claim 1 wherein said first drive means comprises a motor operable in response to said speed signals, and a drive roller rotatable by said motor for contacting and moving the film.

5. A processor as in claim 1 wherein said heater element comprises an elongate, generally convex platen movable between first and second positions, and wherein said second drive means comprises
   a resilient drive belt formed to move along a generally concave path which conforms to the shape of the platen, the platen being adjacent the drive belt when the platen is in the first position, with the film disposed between and in contact with the drive belt and the platen, and
   a motor responsive to control signals for moving the drive belt to thereby move the film.

6. A processor as in claim 5 wherein said heater means further includes means responsive to control signals from said control means for moving said platen between the first and second positions.

7. A processor as in claim 6 further including brake means for inhibiting the movement of the film when said platen is moved to the second position.

8. A processor as in claim 1 wherein said heater element is responsive to electrical current for heating, and wherein said control means includes
   means for sensing the temperature of said heater element and for producing temperature indication signals for indicating the temperature of said heater element,
   heater temperature control means for comparing the temperature indication signals with certain reference signals, and for supplying electrical current to said heater element when the reference signals are of greater magnitude than said temperature indication signals, and
   microprocessor means responsive to said speed signals and said temperature indication signals for producing and supplying reference signals to said heater temperature control means, the reference signals being increased in magnitude when the speed signals indicate an increase in speed of the film supplied to said storage means.

9. A processor as in claim 8 wherein said storage means comprises means for accumulating film when film is supplied to the storage means at a speed greater than the speed at which film is withdrawn from the storage means, and wherein said control means further includes means for determining the amount of film accumulated in said storage means and for producing a stored film indication signal, wherein said heater means further includes heater element moving means responsive to position control signals for moving said heater element away from the film, and wherein the microprocessor is adapted to respond to said stored film indication signal for producing and supplying position control signals to said heater element moving means when the stored film indication signal indicates that less than a certain amount of film has accumulated in said storage means.

10. A processor as in claim 9 wherein said microprocessor is adapted to produce a warning signal when the stored film indication signal indicates that the amount of film accumulated in said storage means has exceeded a predetermined amount.

11. A processor as in claim 1 further including a housing in which is disposed said supply means, receiving means, storage means, first and second drive means, heater means and control means, said housing including viewing means through which a person may view the interior of the housing, said processor further including means for guiding the film from the heater means adjacent to and past the viewing means to the receiving means, to enable viewing the film.

12. A processor as in claim 11 further including reflective means disposed behind the path of travel of the film adjacent to the viewing means so that the film travels between the viewing means and the reflective means, said reflective means adapted to reflect light entering the housing through the viewing means.

* * * * *